United States Patent

Marshall et al.

[11] Patent Number: 5,939,681
[45] Date of Patent: Aug. 17, 1999

[54] CONTAINER-FILLING-AND-WEIGHING DEVICE HAVING VERTICALLY SPACED SINGLE POINT LOAD CELLS

[75] Inventors: Donald O. Marshall, 3505 En-joie Dr., Columbus, Ohio 43228; Donald G. Marshall, Hilliard, Ohio

[73] Assignee: Donald O. Marshall, Columbus, Ohio

[21] Appl. No.: 08/959,126

[22] Filed: Oct. 28, 1997

[51] Int. Cl.⁶ .......................... G01G 13/02; G01G 19/00; G01G 21/22

[52] U.S. Cl. .......................... 177/118; 177/160; 177/199; 177/253

[58] Field of Search ................................... 177/160, 253, 177/116, 118, 199, 200; 141/83

[56] References Cited

U.S. PATENT DOCUMENTS

| | | | |
|---|---|---|---|
| 3,366,190 | 1/1968 | Lau | 177/116 |
| 4,421,186 | 12/1983 | Bradley | 177/211 |
| 4,526,245 | 7/1985 | Ruf et al. | 177/160 |
| 5,753,868 | 5/1998 | Diem | 177/116 |

Primary Examiner—Randy W. Gibson
Attorney, Agent, or Firm—Francis T. Kremblas, Jr.

[57] ABSTRACT

A container-filling-and-weighing device having a frame and a connected weighing member. A first single point load cell is connected near the top of the weighing member and attaches to the frame. A second single point load cell extends from near the bottom of the weighing member and attaches to the frame. The load cells are preferably parallel, essentially identical and intersected by a vertical line. Any nonvertical force applied to the upper load cell is offset numerically by an equal and opposite nonvertical force applied to the lower load cell. These disparities are removed by averaging the numerical output from each load cell.

8 Claims, 2 Drawing Sheets

CONTAINER-FILLING-AND-WEIGHING DEVICE HAVING VERTICALLY SPACED SINGLE POINT LOAD CELLS

BACKGROUND OF THE INVENTION

1. Field Of The Invention

The invention relates generally to container-filling-and-weighing devices, such as gross weigh auger baggers. The invention relates more specifically to the element or elements, and their configuration, used to measure the weight of a container filled by the filling and weighing device.

2. Description Of The Related Art

A conventional gross weigh auger bagger, which is one example of a container-filling-and-weighing device, is shown in FIG. 1, having a frame 2 to which a motor 4, auger 6 and hopper 8 are mounted. A weighing arm 10 is connected to the frame by load sensing devices, such as shear beam load cells 12, mounted between the top of the frame and the top of the weighing arm. A filling nozzle 14 extends from the auger over the weighing arm.

An outer tube 16 extends around the nozzle and rests against the top of the weighing arm. The outer tube and nozzle extend into a hole in the side of a bag, and fill the bag with particulate material forced through the nozzle by the auger. Any downward force exerted on the outer tube by the bag and its contents is directed onto the top of the weighing arm.

The bottom of the bag rests on a cantilevered platform 18 extending outwardly from the weighing arm. The weighing arm is weighted downwardly by the bag filled with particulate matter, and the downward force deflects the load cells, causing them to emit a signal or change characteristics in proportion to the force. The function of such a machine is to fill a bag while directing all the weight of the bag onto the load cells so that an accurate measurement of weight can be made during filling. The filling operation is then stopped when a predetermined weight of material has been deposited into the bag.

In existing machines, such as the one shown in FIG. 1, the position of the bag on the outer tube and the cantilevered platform affects the weight measurement. This results from the configuration of the machine, in which the downward (vertical) force applied by the bag and its contents is horizontally offset from the load cells. The downward force due to gravity that the bag applies to the outer tube of the nozzle and the cantilevered platform has a moment arm extending perpendicularly from the point where the force is applied (the nozzle and the cantilevered platform) to the point where the force is measured (the load cells). Placement of the bag on the nozzle and cantilevered platform creates a torque, which causes nonvertical forces to be applied to the load cells.

The nonvertical forces affect the weight measurement made by the load cells, since they affect the deflection of the load cells. When subsequently filled bags are placed on the machine at different distances from the load cells, moment arms of different length exist. As the moment arms vary, the nonvertical forces vary, and therefore the measured weights vary. This is so even if each of the bags has identical weight. If each bag were placed at exactly the same position on the nozzle and cantilevered platform, the nonvertical forces would be the same and could be neglected or electronically removed. However, in manufacturing facilities using these machines, placement of a bag in exactly the same position each time is impractical and rarely achievable.

In conventional machines such as the apparatus shown in FIG. 1, the load cell (or two load cells side by side) is positioned near the top of the weighing arm and a laterally flexible, longitudinally rigid plate is positioned near the bottom. The purpose of the flexible plate is to reduce the deflection of the load cells due to the nonvertical forces by permitting essentially free vertical translation (lateral flexure of the plate) and reducing horizontal displacement (compression along the length of the plate). However, in order for the flexible plate to eliminate most of the effect of the nonvertical forces, the plate must be perfectly parallel to the load cells. Even if the flexible plate is adjusted properly, it rapidly departs from its setting during operation.

Inaccuracies in most conventional machines range from several ounces to several pounds for a 50 pound bag. Therefore, the need exists for a significantly more accurate device connecting the weighing arm to the frame.

SUMMARY OF THE INVENTION

The invention is an improved container-filling-and-weighing apparatus. The apparatus includes a frame member and a weighing member connected to the frame member for supporting a container. The improvement comprises a first single point load cell rigidly mounted to the weighing member at a first position and extending to rigid attachment with the frame member. The improvement further comprises a second single point load cell rigidly mounted to the weighing member at a second position, which second position is vertically lower than said first position. The second single point load cell extends to rigid attachment with the frame member.

Figure 1:
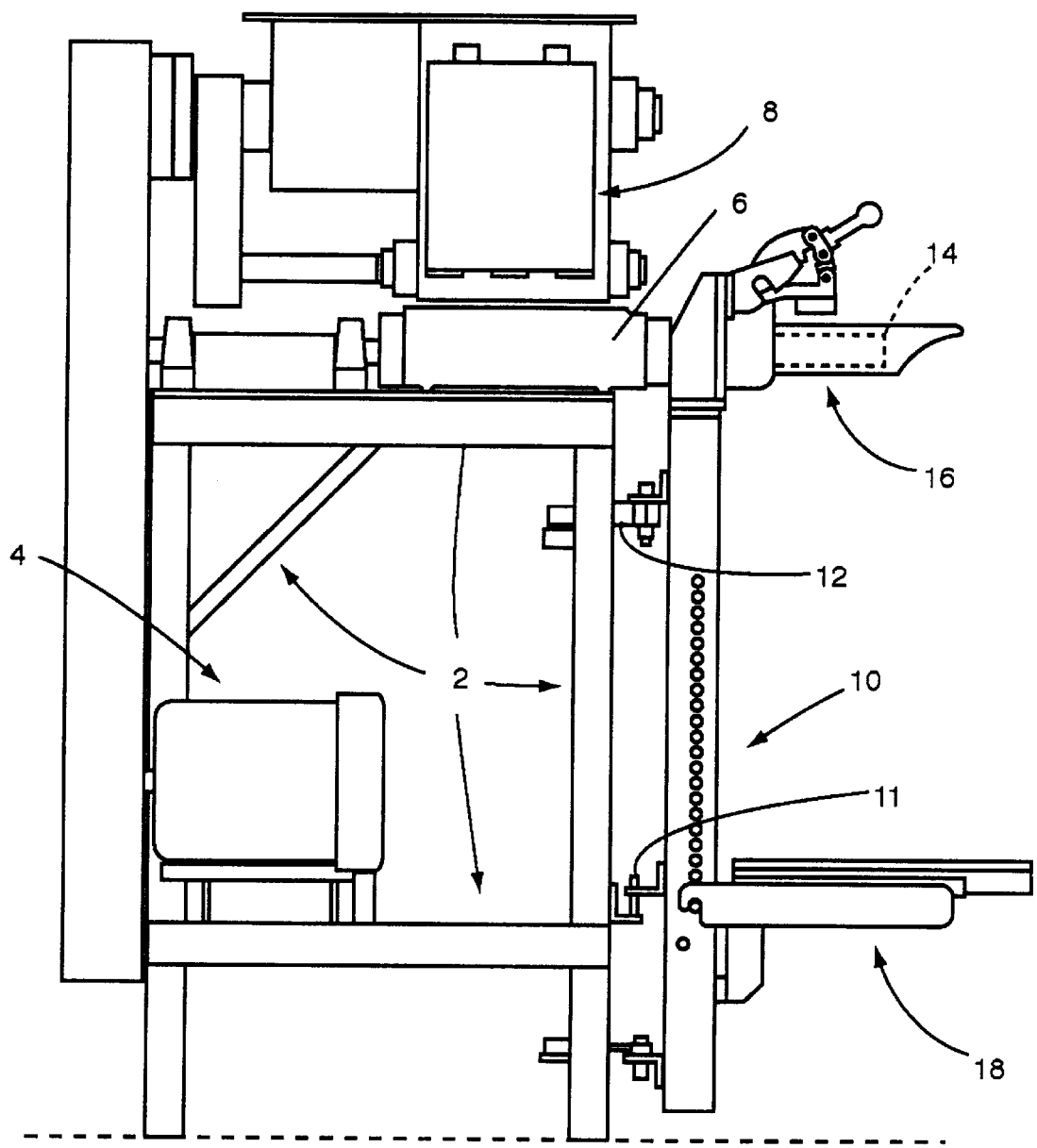
FIG. 1 is a side view illustrating a conventional gross weigh auger bagger.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

BRIEF DESCRIPTION OF THE PREFERRED EMBODIMENT

Figure 2:
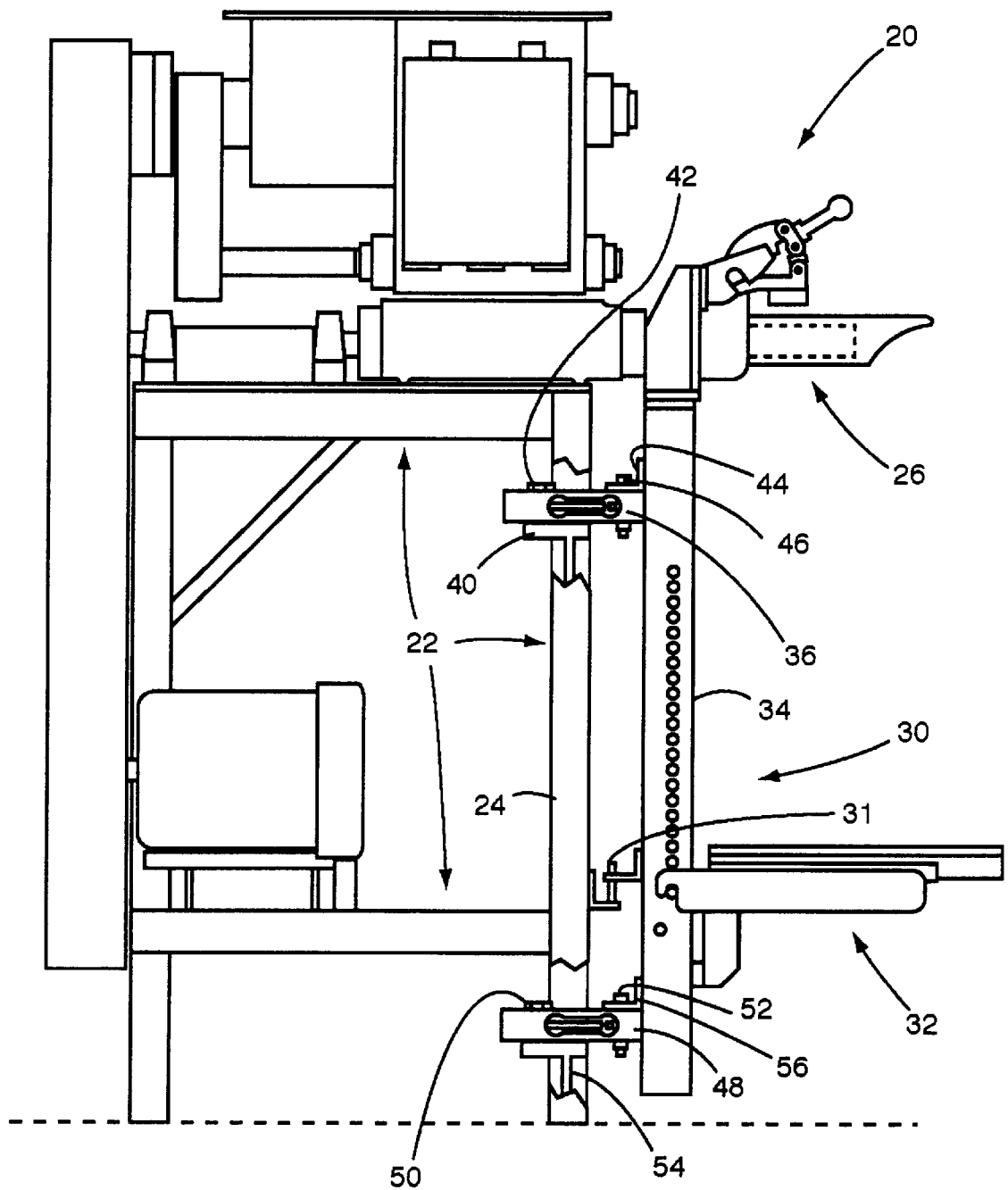
FIG. 2 is a side view in partial section illustrating the preferred embodiment of the present invention.

In FIG. 2, the preferred embodiment of the present invention is shown. Although a gross weigh auger bagger is shown, the invention can be used with other filling and weighing machines. The filling and weighing machine 20 has a frame 22, including a vertical frame member 24, connected to a weighing arm 30. The weighing arm 30 includes a cantilevered platform 32 adjustably mounted, in a conventional manner, to a vertical weighing member 34.

A first single point load cell 36 extends between the weighing member 34 and the frame member 24 near the upper ends of both. The load cell 36 is rigidly mounted at one end to a shelf 40 on the frame member 24 by a conventional nut and bolt fastener 42. The opposite end of the load cell 36 is rigidly mounted to the L-bracket 44, which is mounted to the weighing member 34, by a conventional nut and bolt fastener 46.

A second single point load cell 48 extends between the weighing member 34 and the frame member 24, preferably directly below the load cell 36 near the lower ends of the weighing member 34 and the frame member 24. Preferably a vertical line drawn through the load cell 36 will intersect the load cell 48. The load cell 48 is preferably attached to the frame member 24 and weighing member 34 by conventional nut and bolt fasteners 50 and 52 rigidly mounting opposite ends of the load cell 48 to the shelf 54 and the L-bracket 56, respectively.

An elastic bushing (not shown) may be clamped between the load cell 48 and the shelf 54 to permit slight adjustment in alignment of the lower load cell 48 relative to the upper load cell 36. The bolt 31 extends from an upper bracket and seats against a lower bracket during transporting of the machine 20. During operation, the bolt 31, just as with the bolt 11 in FIG. 1, is retracted so it does not interfere with the ordinary movement of the weighing arm 30.

The load cells 36 and 48 are preferably of substantially the same length, and are most preferably substantially identical. The load cells 36 and 48 are also preferably oriented substantially parallel to one another. Any difference from exactly parallel will cause some error, but some small percent of error due to a minor departure from the preferred parallel relationship will be tolerated for practical purposes. In the present invention, it is relatively easy to approach the desired parallel alignment to minimize any error. An error of 0.1 to 0.05 pounds has been achieved for a 50 pound bag, and this is considered very reasonable and a very significant improvement over the prior art configuration. The element of each load cell which is preferably substantially parallel to the same element of the other load cell is the axis of the load cell member which is deflected by the force to be measured. In most single point load cells, the axis of deflection is aligned with the axis of the load cell casing.

Essentially any single point load cell will function sufficiently for the present invention, and the inventors have determined that the type AB load cell produced by SCAIME (Z. I de Juvigny —B. P. 501, F.74105 ANNEMASSE CEDEX) is a suitable device. A single point load cell measures, almost exclusively, the force applied in a direction perpendicular to the load cell's axis of deflection. In the present invention the load cell's axis of deflection is aligned perpendicular to the vertically directed weight applied to the weighing arm 30. Although single point load cells are effective in dramatically reducing errors due to nonvertical forces, they are not perfect. Any small error due to the effect of nonvertical forces is eliminated by the new configuration of the load cells 36 and 48.

As discussed above, the load cells 36 and 48 connect between the frame 22 and the weighing arm 30, and are deflected by an amount which is a function of the downward force of a bag placed on the nozzle 26 and the cantilevered platform 32. The electrical output from each load cell 36 and 48 is input to a conventional computer processor (not shown) which converts the electrical outputs into a number in units of weight, such as pounds or units of mass, such as kilograms.

In the preferred embodiment the load cell 36 is mounted directly above the load cell 48, and therefore the nonvertical (rightward) force exerted by the weighing member 34 on the load cell 36 is equal in magnitude and opposite in direction to the nonvertical (leftward) force exerted by the weighing member 34 on the load cell 48. The torque due to the moment arm causes these nonvertical forces as described above. The small nonvertical force components measured by each load cell are equal in magnitude and opposite in direction, resulting in a small equal and opposite disparity in the measured electrical output of the load cells.

In order to eliminate the error from the measured electrical outputs of the load cells 36 and 48, these electrical outputs are averaged by the computer. The disparity in electrical output due to the nonvertical forces on the upper load cell 36 is removed by adding it to the equal and opposite disparity in electrical output due to equal and opposite nonvertical forces on the lower load cell 48 and dividing by two (or the number of load cells, which may be greater than two in an alternative embodiment). The averaging (which could be any mathematic algorithm which results in calculation of the mean or average output from the load cells) eliminates the small error due to the nonvertical forces.

In addition to the preferred configuration described above, it is contemplated that other configurations may be used. For example, a pair of load cells can be mounted in vertically spaced, but horizontally offset positions. Three or more single point load cells could be mounted with two lower load cells spaced in a side-by-side relation, with the third load cell mounted above the lower cells and along a vertical line bisecting the space between the lower load cells. Alternatively, this configuration could be reversed, with a single lower load cell and two upper load cells. Still further, there could be two upper and two lower load cells. The number of load cells and the position can obviously be varied to an extent which will be understood by a person of ordinary skill upon reading the present description.

While certain preferred embodiments of the present invention have been disclosed in detail, it is to be understood that various modifications may be adopted without departing from the spirit of the invention or scope of the following claims.

We claim:

1. A method of filling and weighing a container using an apparatus including a frame member and a weighing member mounted to the frame member, the method comprising:
   (a) providing a first single point load cell mounted at a first position between the weighing member and the frame member;
   (b) providing a second single point load cell mounted at a second position, which is vertically lower than said first position, between the weighing member and the frame member;
   (c) directing the weight of the container onto the weighing member while filling the container;
   (d) detecting a first output from the first single point load cell, and detecting a second output from the second single point load cell; and
   (e) calculating an average of the first and second outputs.

2. A method in accordance with claim 1, wherein said first single point load cell is substantially parallel to said second single point load cell.

3. A method in accordance with claim 1, wherein said first single point load cell and said second single point load cell are intersected by a vertical line.

4. A method in accordance with claim 1, further comprising ceasing flow of matter into the container once the average of the first and second outputs reaches a predetermined amount.

5. An improved gross weigh bagger apparatus including a frame and a weighing arm connected to the frame, the apparatus also including a filling nozzle connected to the frame, an outer tube extending around the nozzle and supported by the weighing arm, said outer tube being configured to receive a bag disposed in a position to receive particulate matter directed through said nozzle, and a feed source communicating a flow of particulate matter to the nozzle, the improvement comprising:

(a) a first single point load cell rigidly mounted to the weighing arm at a first position and extending to rigid attachment with the frame;

(b) a second single point load cell rigidly mounted to the weighing arm at a second position vertically spaced below the first position and extending to rigid attachment with the frame; and (c) a processor connected to the first and second load cells for receiving and averaging the output signals from said load cells representative of the weight of the bag's contents while the bag is supported by the weighing arm, and for generating a signal communicated to the feed source to cease the flow of particulate matter to the bag once the weight of the bag's contents reaches a predetermined amount.

6. An improved apparatus in accordance with claim 5, wherein the first single point load cell is substantially parallel to the second single point load cell.

7. An improved apparatus in accordance with claim 5, wherein the first single point load cell has a length substantially equal to the second single point load cell.

8. An improved apparatus in accordance with claim 5, wherein the first single point load cell and the second single point load cell are intersected by a vertical line.

* * * * *